US011923620B1

(12) United States Patent
Liu et al.

(10) Patent No.: US 11,923,620 B1
(45) Date of Patent: Mar. 5, 2024

(54) COMPACT CERAMIC CHIP ANTENNA ARRAY BASED ON ULTRA-WIDE BAND THREE-DIMENSIONAL DIRECTION FINDING

(71) Applicant: CHANGSHA CHIXIN SEMICONDUCTOR TECH CO., LTD., Changsha (CN)

(72) Inventors: Jianjun Liu, Changsha (CN); Yu Li, Changsha (CN)

(73) Assignee: CHANGSHA CHIXIN SEMICONDUCTOR TECH CO., LTD., Changsha (CN)

( * ) Notice: Subject to any disclaimer, the term of this patent is extended or adjusted under 35 U.S.C. 154(b) by 0 days.

(21) Appl. No.: 18/499,336

(22) Filed: Nov. 1, 2023

Related U.S. Application Data

(63) Continuation of application No. PCT/CN2023/118921, filed on Sep. 14, 2023.

(30) Foreign Application Priority Data

Dec. 14, 2022 (CN) ......................... 202211600970.6

(51) Int. Cl.
*H01Q 5/335* (2015.01)
*H01Q 19/00* (2006.01)

(52) U.S. Cl.
CPC ........... *H01Q 5/335* (2015.01); *H01Q 19/005* (2013.01)

(58) Field of Classification Search
CPC ............. H01Q 21/0025; H01Q 21/061; H01Q 21/0093; H01Q 21/0087; H01Q 1/2283; H01Q 1/38; H01Q 5/335; H01Q 19/005
See application file for complete search history.

(56) References Cited

U.S. PATENT DOCUMENTS

| | | | | |
|---|---|---|---|---|
| 7,324,049 B2 * | 1/2008 | Myoung | .................. | H01Q 9/40<br>343/846 |
| 2010/0315303 A1 * | 12/2010 | Kearney | .................. | H01Q 9/42<br>343/848 |

FOREIGN PATENT DOCUMENTS

| | | |
|---|---|---|
| CN | 114583447 A | 6/2022 |

OTHER PUBLICATIONS

Written Opinion of the International Searching Authority dated Nov. 21, 2023, in counterpart International Patent Application No. PCT/CN2023/118921 (4 pages in English, 4 pages in Chinese).

(Continued)

*Primary Examiner* — David E Lotter
(74) *Attorney, Agent, or Firm* — NSIP Law

(57) ABSTRACT

The present invention provides a compact ceramic chip antenna array based on ultra-wide band three-dimensional direction finding, comprising a dielectric substrate, a metal floor and a coplanar waveguide feeder, wherein the front face of the dielectric substrate is provided with three antenna units; three coplanar waveguide feeders are electrically connected to three antenna units, respectively; a plurality of impedance matching structures are further arranged on a front side and a back side of the dielectric substrate, respectively; the first and second impedance matching structures are respectively arranged on a right side of the first antenna unit and a left side of the third antenna unit; the first and second impedance matching structures are rectangular grooves etched on the metal floor; the third, fourth, fifth and sixth impedance matching structures are respectively arranged at both ends of the second coplanar waveguide feeder; and the fifth and sixth impedance matching structures are rectangular metal patches. The compact ceramic chip antenna array based on ultra-wide band three-dimensional direction finding provided by the present invention not only improves the dimension of target positioning, but (Continued)

also effectively reduces the space occupied by the antenna, and is suitable for wireless handheld devices in indoor accurate positioning.

8 Claims, 5 Drawing Sheets

(56) References Cited

OTHER PUBLICATIONS

International Search Report dated Nov. 21, 2023, in counterpart International Patent Application No. PCT/CN2023/118921 (4 pages in Chinese).
International Search Report No. PCT/CN2023/118921 dated Sep. 27, 2023 (1 Page in Korean).

* cited by examiner

COMPACT CERAMIC CHIP ANTENNA ARRAY BASED ON ULTRA-WIDE BAND THREE-DIMENSIONAL DIRECTION FINDING

CROSS REFERENCE TO RELATED APPLICATIONS

This application is a continuation of International Application No. PCT/CN2023/118921 filed on Sep. 14, 2023, and claims the benefit under 35 USC 119(a) of Chinese Patent Application No. 202211600970.6 filed on Dec. 14, 2022, in the China National Intellectual Property Administration.

TECHNICAL FIELD

Embodiments of the present invention relate to the field of ceramic chip antenna arrays, and more particularly, to a compact ceramic chip antenna array based on ultra-wide band three-dimensional direction finding.

BACKGROUND ART

Along with the refinement of the life scene, people's demand for indoor positioning increases. The technology of using different types of anchor nodes to provide positioning capability is also developing, such as Wi-Fi, Bluetooth, Ultra-wide Band (UWB) technology, etc. The UWB technology is widely used in industrial Internet, vehicle networking and smart home because of its advantages of nanosecond narrow-band pulse and ultra-wide band.

The UWB technology can be traced back to telegraph systems that include the transatlantic pulse signal transmission noted in 1901. The technology then finds some applications in radar, mainly for military purposes. In 2002, the U.S. Communications Commission adopted the regulations that the frequency band of 3.1-10.6 GHz was classified as commercial use and the frequency band of 22-29 GHz was classified as on-board radar system. Since then, UWB technology has broken through the application limitations only in radar and military communications in the past decades. In the next few years, UWB technology has become a powerful competitive solution for short-range high-speed wireless systems due to its simple transmit-receive structure, low power consumption and high transmission rate. Since 2019, some well-known companies and institutions, such as APPLE, NXP and Qorvo, have released new products of UWB location technology. The UWB location technology has received extensive attention from the scientific and media communities. The Fine Ranging (FIRA) Alliance for promoting UWB industry and technology was launched in August 2019. In addition, a white paper related to UWB systems was presented in October 2020. In 2022, IEEE updated UWB's relevant standards (802.15.4z) to pave the way for UWB to further enter mainstream applications. Currently, the development of UWB has been boosted by multiple assistance from markets and standards-making organizations. The location technology using fifth and ninth bands of UWB has achieved access to multiple mass wireless intelligent devices, such as Apple, MIUI, Samsung products, etc.

There are several UWB location methods to meet the needs of different applications. Among them, the location method based on Angle of Arrival (AOA) measurement is one of the most widely studied location methods. The angle-of-arrival AOA detection of the Phase-Difference-of-Arrival (PDOA) has proved to be more potential, giving the user a convenient and informed experience. According to the traditional direction-finding location method based on arrays usually, the two-dimensional position of the target is estimated by the one-dimensional angle measurement of the target's incoming wave direction. In the three-dimensional location with more practical value, the sensor nodes are often distributed in a three-dimensional space. The three-dimensional information can more truly reflect the node position, which requires the location algorithm in the three-dimensional space to be able to estimate the unknown node position of the wireless sensor. In this case, it is necessary to simultaneously estimate the azimuth angle and the pitch angle of the target using a two-dimensional antenna array. However, this also presents new challenges to the design of antenna arrays. On the one hand, the additional mobile phone antenna needs to occupy a larger space. On the other hand, the size relationship of the original antenna results in a smaller relative spacing between the antennas, resulting in unnecessary coupling, which has a negative impact on direction finding accuracy.

Accordingly, there is a need to provide a compact ceramic chip antenna array that effectively addresses the above problems. It is applicable to communication equipment such as portable mobile terminal devices in Internet of Things.

SUMMARY OF THE INVENTION

The present invention provides a compact ceramic chip antenna array based on ultra-wide band three-dimensional direction finding, which not only improves the dimension of target positioning, but also effectively reduces the space occupied by the antenna, and is suitable for wireless handheld devices in indoor accurate positioning.

Embodiments of the present invention provide a compact ceramic chip antenna array based on ultra-wide band three-dimensional direction finding, comprising a dielectric substrate, a metal floor and a coplanar waveguide feeder; a first antenna unit, a second antenna unit and a third antenna unit are arranged on a front side of the dielectric substrate; the first antenna unit and the third antenna unit are symmetrically arranged on both sides of the second antenna unit, respectively; the coplanar waveguide feeder comprises a first coplanar waveguide feeder, a second coplanar waveguide feeder and a third coplanar waveguide feeder; the first coplanar waveguide feeder, the second coplanar waveguide feeder and the third coplanar waveguide feeder are electrically connected to the first antenna unit, the second antenna unit and the third antenna unit, respectively; a first impedance matching structure, a second impedance matching structure, a third impedance matching structure and a fourth impedance matching structure are further arranged on the front side of the dielectric substrate; a seventh impedance matching structure, an eighth impedance matching structure, a ninth impedance matching structure and a tenth impedance matching structure are arranged on a back side of the dielectric substrate;

the first impedance matching structure and the second impedance matching structure respectively correspond to the seventh impedance matching structure and the eighth impedance matching structure; the third impedance matching structure and the fourth impedance matching structure respectively correspond to the ninth impedance matching structure and the tenth impedance matching structure; wherein the first impedance matching structure and the second impedance matching structure are respectively arranged on a right side of the first antenna unit and a left side of the third antenna unit; the first impedance matching structure and the second impedance matching structure are rectangular grooves etched on the metal floor; the third impedance matching structure and the fourth impedance matching structure are arranged on an extension section of a first end of the second coplanar waveguide feeder.

Preferably, the first antenna unit, the second antenna unit and the third antenna unit are arranged in an equilateral triangle; a distance among each geometric center of the first antenna unit, the second antenna unit and the third antenna unit is half of a wavelength corresponding to a highest frequency point at a ninth frequency band of the ultra-wide band; and the ceramic chip antenna array structure has a width of 2.3 cm and a height of 3.4 cm.

Preferably, a fifth impedance matching structure and a sixth impedance matching structure are further arranged on the front side of the dielectric substrate; an eleventh impedance matching structure and a twelfth impedance matching structure are further arranged on the back side of the dielectric substrate; the fifth impedance matching structure and sixth impedance matching structure respectively correspond to the eleventh impedance matching structure and twelfth impedance matching structure;

the fifth impedance matching structure and sixth impedance matching structure are arranged at a second end of the second coplanar waveguide feeder; and the fifth impedance matching structure and the sixth impedance matching structure are rectangular metal patches.

Preferably, the first and second impedance matching structures have a width of 3.1 mm and a height of 3.6 mm; the third and fourth impedance matching structures have a width of 2.6 mm and a height of 17.3 mm; and the thirteenth impedance matching structure has a width of 1.9 mm and a height of 3.6 mm.

Preferably, the fifth impedance matching structure and the sixth impedance matching structure have a width of 2.8 mm and a height of 5.2 mm; and the thirteenth impedance matching structure has a width of 1.9 mm and a height of 3.6 mm.

Preferably, the metal floor comprises a first metal floor, a second metal floor, a third metal floor, a fourth metal floor and a fifth metal floor; the first metal floor, the second metal floor, the third metal floor and the fourth metal floor are arranged on the front side of the dielectric substrate; the fifth metal floor is arranged on the back side of the dielectric substrate; a first gap is provided among the first metal floor, the second metal floor and the first antenna unit; and a second gap is provided among the third metal floor, the fourth metal floor and the third antenna unit.

Preferably, the first metal floor, the second metal floor, the third metal floor, the fourth metal floor, and the fifth metal floor have metallized via holes therethrough.

Preferably, the first antenna unit, the second antenna unit and the third antenna unit respectively comprise a ceramic substrate carrier, a printed monopole antenna plate, a microstrip feeder conduction band and a metal connection plate; the ceramic substrate carrier comprises a first surface, a second surface, a third surface, a fourth surface, a fifth surface and a sixth surface; the printed monopole antenna plate is arranged on the first surface of the ceramic substrate carrier; the microstrip feeder conduction band is arranged on the third surface of the ceramic substrate carrier; the metal connection plate is arranged on the sixth surface of the ceramic substrate carrier; the microstrip feeder conduction band is used for electrically connecting the printed monopole antenna plate and the metal connection plate; the printed monopole antenna plate is a decahedron patch; an upper end of the printed monopole antenna plate is a structure treated with a single corner cutting; and a lower end of the printed monopole antenna plate is a structure treated with a secondary corner cutting.

Preferably, the microstrip feeder conduction band has a trapezoidal structure; the length of the microstrip feeder conduction band is the same as the thickness of the ceramic substrate carrier; the length of a lower bottom side of the microstrip feeder conduction band is the same as the width of the coplanar waveguide feeder; and the length of an upper bottom side of the microstrip feeder conduction band is related to the shape and size of the printed monopole antenna plate.

Preferably, the dielectric substrate has a dielectric constant of 2-10, a loss tangent of $10^{-3}$ or less, and a thickness of 3 mm or less.

Compared to the prior art, the technical solutions of embodiments of the present invention have the following advantageous effects.

A compact ceramic chip antenna array based on ultra-wide band three-dimensional direction finding of an embodiment of the present invention comprises a dielectric substrate, a ceramic chip antenna, an impedance matching structure on the front and back sides of the dielectric substrate, a metal floor and a coplanar waveguide feeder conduction band. The chip antenna array has a planar two-dimensional structure to achieve ultra-wide band three-dimensional direction finding. A first antenna unit, a second antenna unit and a third antenna unit are arranged in an equilateral triangle. Distances among the geometric centers of the first antenna unit, the second antenna unit and the third antenna unit are consistent. Three groups of angular measurement antenna arrays with an included angle of 60 degrees are formed from the first antenna unit to the second antenna unit, the first antenna unit to the third antenna unit and the third antenna unit to the second antenna unit, each group having an angular measurement range within plus or minus 60 degrees. The first antenna unit, the second antenna unit and the third antenna unit array combination can cover the entire 360 degree range of an azimuth angle. Except for an azimuth plane, the first antenna unit, the second antenna unit and the third antenna unit are connected in pairs, and direction finding may also be performed within the plus or minus sixty degree range of a pitch angle, so as to form a three-dimensional direction finding application of the planar antenna array.

Furthermore, by adopting the impedance matching structure of the front and back sides of the dielectric substrate, the planar ceramic chip antenna array may achieve the operating frequency and bandwidth requirements of ultra-wide band ranging with more compact space and distribution, which meets the process design requirements of miniaturization of mobile terminals today.

Further, the ceramic chip antenna array comprises a first antenna unit, a second antenna unit and a third antenna unit. Under the condition of ensuring an effective isolation, each antenna unit is respectively configured to radiate in an ultra-wide band communication frequency band. According to an angle of arrival detection scheme of PDOA, the distance among the geometric centers of the first antenna unit, the second antenna unit and the third antenna unit is half a wavelength. Due to the compact volume of the ceramic chip antenna array, the size from the left edge of the first antenna unit to the right edge of the third antenna unit decreases, so that the space occupied by the whole ceramic chip antenna array effectively decreases.

Further, the first antenna unit, the second antenna unit and the third antenna unit in the ceramic chip antenna array take the geometric center thereof as a base point and have a smaller overall volume relative to other types of antenna units. The space among the first antenna unit, the second antenna unit and the third antenna unit increases. The coupling among the first antenna unit, the second antenna unit and the third antenna unit decreases and the isolation increases significantly so as to achieve an ideal high isolation. Each of the first antenna unit, the second antenna unit and the third antenna unit may be treated as a single antenna unit.

Further, the first impedance matching structure and the second impedance matching structure are respectively arranged on a right side of the first antenna unit and a left side of the third antenna unit; the first impedance matching structure and the second impedance matching structure are rectangular grooves etched on the metal floor; the fifth impedance matching structure and the sixth impedance matching structure are arranged on the second end of the second coplanar waveguide feeder; and the fifth impedance matching structure and the sixth impedance matching structure are rectangular metal patches, so that the second antenna unit operates on a frequency band of an ultra-wide band, which further improves the isolation among the first antenna unit, the second antenna unit and the third antenna unit again.

Furthermore, the first coplanar waveguide feeder conduction band, the second coplanar waveguide feeder conduction band and the third coplanar waveguide feeder conduction band are arranged on the front side of the dielectric substrate, which has advantages such as low cost, simple assembly and stable structure with respect to other feed structures.

Furthermore, the compact ceramic chip antenna array based on ultra-wide band three-dimensional direction finding according to the embodiments of the present invention has a width of only 2.3 cm and a height of only 3.4 cm, and has a very compact structure. After performance tests, it can be operated at fifth to ninth frequency bands of the ultra-wide band designated by FIRA for indoor positioning, namely 6.25 GHz-8.25 GHz, with the mutual coupling degree of the antenna being less than −18 db.

BRIEF DESCRIPTION OF THE DRAWINGS

In order to more clearly describe the technical solutions in the embodiments of the invention or prior art, the following will briefly introduce the drawings to be used in the description of the embodiments or the prior art. It will be apparent to those skilled in the art that the drawings in the following description are only some embodiments, not all, of the invention. For a person of ordinary skill in the art, other drawings may be obtained from the drawings without involving any inventive effort.

DESCRIPTION OF REFERENCE NUMERALS

| | | |
|---|---|---|
| 01, dielectric substrate | 10, first antenna unit | 20, second antenna unit |
| 30, third antenna unit | 11, first surface | 12, second surface |
| 13, third surface | 14, fourth surface | 15, fifth surface |
| 16, sixth surface | 100, ceramic substrate carrier | 101, printed monopole antenna plate |
| 102, microstrip feeder conduction band | 103, metal connection plate | 104, first edge |
| 105, second edge | 41, first metal floor | 42, second metal floor |
| 43, third metal floor | 44, fourth metal floor | 45, fifth metal floor |
| 51, first coplanar waveguide feeder | 52, second coplanar waveguide feeder | 53, third coplanar waveguide feeder |
| 61A, first impedance matching structure | 61B, second impedance matching structure | 62A, third impedance matching structure |
| 62B, fourth impedance matching structure | 63A, fifth impedance matching structure | 63B, sixth impedance matching structure |
| 64A, seventh impedance matching structure | 64B, eighth impedance matching structure | 65A, ninth impedance matching structure |
| 65B, tenth impedance matching structure | 66A, eleventh impedance matching structure | 66B, twelfth impedance matching structure |
| 67, thirteenth impedance matching structure | 70, metallized via hole | |

DETAILED DESCRIPTION OF THE INVENTION

In order to make the objectives, technical solutions, and advantages of embodiments of the invention clearer, the technical solutions in the embodiments of the invention will be described clearly and completely in conjunction with the accompanying drawings in the embodiments of the invention. Obviously, the described embodiments are part of the invention, rather than all of the embodiments. Based on the embodiments in the invention, all other embodiments obtained by a person skilled in the art without involving any inventive effort are within the scope of protection of the invention.

Hereinafter, embodiments of the present invention will be described in detail with reference to specific embodiments. The following specific embodiments may be combined with one another, and the same or similar concepts or processes may not be repeated in some embodiments.

Based on the problems existing in the prior art, the embodiments of the present invention provide a compact ceramic chip antenna array based on ultra-wide band three-dimensional direction finding, which not only improves the dimension of target positioning, but also effectively reduces the space occupied by the antenna, and is suitable for wireless handheld devices in indoor accurate positioning.

Figure 1A:
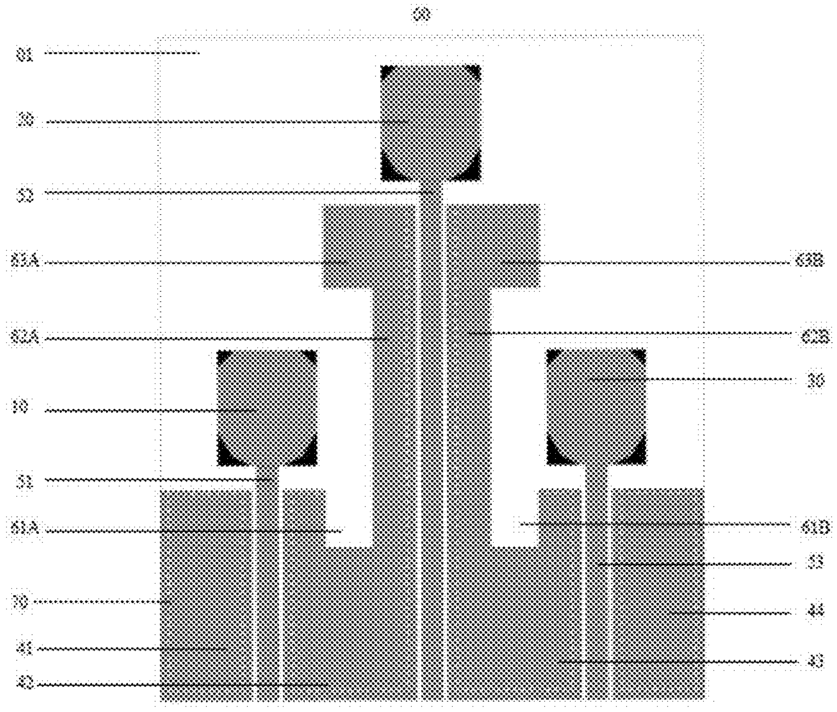
FIG. 1A is a front structural view of a compact ceramic chip antenna array based on ultra-wide band three-dimensional direction finding according to an embodiment of the present invention.
Figure 1B:
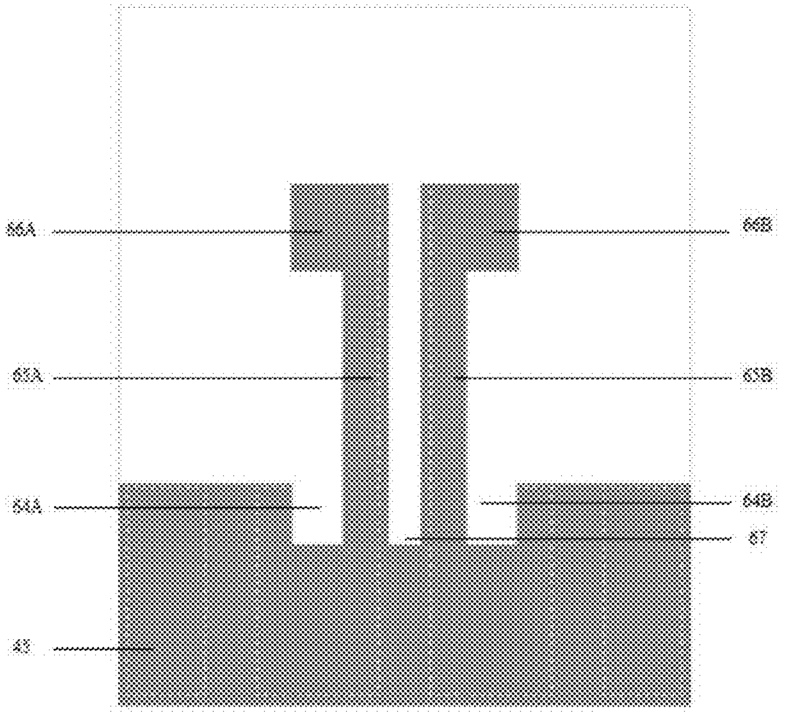
FIG. 1B is a reverse structural view of a compact ceramic chip antenna array based on ultra-wide band three-dimensional direction finding according to an embodiment of the present invention.

FIG. 1A is a front structural view of a compact ceramic chip antenna array based on ultra-wide band three-dimensional direction finding according to an embodiment of the present invention. FIG. 1B is a reverse structural view of a compact ceramic chip antenna array based on ultra-wide band three-dimensional direction finding according to an embodiment of the present invention. Referring now to FIGS. 1A and 1B, an embodiment of the present invention provides a compact ceramic chip antenna array based on ultra-wide band three-dimensional direction finding 00, including a dielectric substrate 01, a metal floor and a coplanar waveguide feeder.

A first antenna unit 10, a second antenna unit 20 and a third antenna unit 30 are arranged on a front side of the dielectric substrate 01. The first antenna unit 10 and the third antenna unit 30 are symmetrically arranged on both sides of the second antenna unit 20, respectively.

The coplanar waveguide feeder includes a first coplanar waveguide feeder 51, a second coplanar waveguide feeder 52 and a third coplanar waveguide feeder 53. The first coplanar waveguide feeder 51, the second coplanar waveguide feeder 52 and the third coplanar waveguide feeder 53 are electrically connected to the first antenna unit 10, the second antenna unit 20 and the third antenna unit 30, respectively.

A first impedance matching structure 61A, a second impedance matching structure 61B, a third impedance matching structure 62A and a fourth impedance matching structure 62B are arranged on the front side of the dielectric substrate 01.

A seventh impedance matching structure 64A, an eighth impedance matching structure 64B, a ninth impedance matching structure 65A, a tenth impedance matching structure 65B and a thirteenth impedance matching structure 67 are arranged on a back side of the dielectric substrate 01.

The first impedance matching structure 61A and the second impedance matching structure 61B respectively correspond to the seventh impedance matching structure 64A and eighth impedance matching structure 64B. The third impedance matching structure 62A and the fourth impedance matching structure 62B respectively correspond to the ninth impedance matching structure 65A and tenth impedance matching structure 65B.

Herein, the first impedance matching structure 61A and the second impedance matching structure 61B are respectively arranged on a right side of the first antenna unit 10 and a left side of the third antenna unit 30. The first impedance matching structure 61A and the second impedance matching structure 61B are rectangular grooves etched on the metal floor. The third impedance matching structure 62A and the fourth impedance matching structure 62B are arranged on an extension section of a first end of the second coplanar waveguide feeder 52.

In some embodiments, a fifth impedance matching structure 63A and a sixth impedance matching structure 63B are further arranged on the front side of the dielectric substrate.

An eleventh impedance matching structure 66A and a twelfth impedance matching structure 66B are further arranged on the back side of the dielectric substrate.

The fifth impedance matching structure 63A and the sixth impedance matching structure 63B respectively correspond to the eleventh impedance matching structure 66A and the twelfth impedance matching structure 66B.

The fifth impedance matching structure 63A and the sixth impedance matching structure 63B are arranged at a second end of the second coplanar waveguide feeder 52. The fifth impedance matching structure 63A and the sixth impedance matching structure 63B are rectangular metal patches.

In some embodiments, the first antenna unit 10, the second antenna unit 20 and the third antenna unit 30 are arranged in an equilateral triangle. A distance among each geometric center of the first antenna unit 10, the second antenna unit 20 and the third antenna unit 30 is half a wavelength corresponding to a highest frequency point at a ninth frequency band of the ultra-wide band. The ceramic chip antenna array structure has a width of 2.3 cm and a height of 3.4 cm.

In some embodiments, the first impedance matching structure 61A and the second impedance matching structure 61B have a width of 3.1 mm and a height of 3.6 mm. The third and fourth impedance matching structures 62A, 62B have a width of 2.6 mm and a height of 17.3 mm. The thirteenth impedance matching structure 67 has a width of 1.9 mm and a height of 3.6 mm.

In some embodiments, the fifth impedance matching structure 63 and the sixth impedance matching structure 63B have a width of 2.8 mm and a height of 5.2 mm. The thirteenth impedance matching structure 67 has a width of 1.9 mm and a height of 3.6 mm.

In some embodiments, the first antenna unit 10, the second antenna unit 20, and the third antenna unit 30 are all ceramic chip antennas of the same size and material. The first antenna unit 10, the second antenna unit 20, and the third antenna unit 30, respectively, are configured to radiate in the ultra-wide band communication band while ensuring effective isolation. The first antenna unit 10, the second antenna unit 20 and the third antenna unit 30 share a metal floor and a microstrip feeder conduction band.

In some embodiments, the second antenna unit 20 has a different height than the first antenna unit 10 and the third antenna unit 30, thereby forming a two-dimensional antenna array structure. Due to the requirement of ultra-wide band three-dimensional direction finding, the height of the second antenna unit 20 is higher than that of the first antenna unit 10 and the third antenna unit 30 by a sufficient distance to ensure the angle measurement range, so that the length of the second coplanar waveguide feeder conduction band 52 connecting the second antenna unit 20 is longer than that of the first coplanar waveguide feeder 51 and the third coplanar waveguide feeder 53. The different lengths of the coplanar waveguide feeder conduction bands mean that the phases generated by the radio frequency signals from the system to the first antenna unit 10 and the third antenna unit 30 and the radio frequency signals from the system to the second antenna unit 20 are different. Also, the second antenna unit 20 may not adopt the same floor structure as the first antenna unit 10 and the third antenna unit 30 due to the limitation of the physical structure. The consequence of this is that the second antenna unit 20 is heavily mismatched and cannot operate at the frequency band of the ultra-wide band required for positioning and ranging. A plurality of impedance matching structures are thus proposed and used in a two-dimensional ceramic chip antenna array.

Multiple impedance matching structures on the dielectric substrate 01 may effectively change the center frequency and operating bandwidth of the antenna unit.

First, the second antenna unit 20 has a high center operating frequency beyond the frequency band of the ultra-wide band in case of mismatch. Since the physical length of the antenna is inversely proportional to its operating frequency, increasing the height of the second antenna unit 20 reduces its center operating frequency. However, the first antenna unit 10, the second antenna unit 20 and the third antenna unit 30 are fixed relative to each other due to the requirement of de-blurring multi-values for ultra-wide band three-dimensional direction finding. Therefore, a first impedance matching structure 61A is etched on the floor on the right side of the first antenna unit 10 and a second impedance matching structure 61B is etched on the floor on the left side of the third antenna unit 30, the first impedance matching structure 61A and the second impedance matching structure 61B being rectangular slots, so that the relative length of the second antenna unit 20 to the floor is increased, thereby lowering the operating frequency thereof.

Secondly, the metal coplanar waveguide conduction band is connected to the second antenna unit 20. The presence of the metal may generate a reflection effect on the first antenna unit 10 and the third antenna unit 30, affecting the bandwidth of the first antenna unit 10 and the third antenna unit 30, and only the narrower metal conduction band on both sides of the metal coplanar waveguide conduction band. However, in this case, the bandwidth of the second antenna unit 20 is narrower and cannot be used in an ultra-wide band system. In order to improve the matching thereof, a third impedance matching structure 62A and a fourth impedance matching structure 62B on both sides of the coplanar waveguide under the second antenna unit 20 are added without affecting the first antenna unit 10 and the third antenna unit 30. The third impedance matching structure 62A and the fourth impedance matching structure 62B are metal conduction bands, thereby increasing the bandwidth of the second antenna unit 20.

Finally, the increased bandwidth is still not able to completely cover the entire ultra-wide band frequency band, which can be improved by further adding the third impedance matching structure 62A and the fourth impedance matching structure 62B. This, however, has a negative effect on the bandwidth and overall radiation conditions of the first antenna unit 10 and the third antenna unit 30. In the case where the characteristics of the first antenna unit 10, the second antenna unit 20 and the third antenna unit 30 are considered as a whole, the fifth impedance matching structure and the sixth impedance matching structure are added only above the extension of the metal conduction band on both sides of the second antenna unit 20, and the fifth impedance matching structure and the sixth impedance matching structure are two metal patches, so that the width of the metal conduction band is not increased below to affect the radiation of the first antenna unit 10 and the second antenna unit 30, and a better matching of the second antenna unit 20 is enabled, further increasing the bandwidth of the second antenna unit 20. The depth of the thirteenth impedance matching structure 67 is the same as that of the seventh impedance matching structure 64A and the eighth impedance matching structure 64B, and also serves to increase the relative length of the second antenna unit 20, thereby reducing the center operating frequency of the second antenna unit 20.

In some embodiments, the metal floor includes a first metal floor 41, a second metal floor 42, a third metal floor 43, a fourth metal floor 44 and a fifth metal floor 45. The first metal floor 41, the second metal floor 42, the third metal floor 43 and the fourth metal floor 44 are arranged on the front side of the dielectric substrate 01. The fifth metal floor 45 is arranged on the back side of the dielectric substrate 01. A first gap is provided among the first metal floor 41, the second metal floor 42 and the first antenna unit 10, and the third metal floor 43. A second gap is provided among the third metal floor 43, the fourth metal floor 44 and the third antenna unit 30. The upper bottom edge of the metal floor leaves a space, i.e., a first gap and a second gap, with the lower bottom edge of the projection of the first antenna unit 10 and the third antenna unit 30 on the dielectric substrate 01 to avoid adversely affecting its radiation characteristics. A person skilled in the art would have been able to set the sizes of the first gap and the second gap according to needs, and the description thereof will not be repeated here.

In particular implementations, the first metal floor 41 and the second metal floor 42 are bilaterally symmetric with the third metal floor 43 and the fourth metal floor 44 about the axis of the intermediate second coplanar waveguide feeder 52. The fifth metal floor 45 has the same height as that of the first metal floor 41, the second metal floor 42, the third metal floor 43, and the fourth metal floor 44. The width of the fifth metal floor 45 is the same as the width of the dielectric substrate 01. Since the feed structure is not placed on the fifth metal floor 45, the fifth metal floor 45 as a whole corresponds to the first metal floor 41, the second metal floor 42, the third metal floor 43, and the fourth metal floor 44. The first metal floor 41, the second metal floor 42, the third metal floor 43, the fourth metal floor 44 metal floor 43, the fourth metal floor 44 and the fifth metal floor 45 have a metalized through holes 70 therethrough to ensure the adhesive strength between the upper and lower floors and the rectangular ceramic substrate carrier 100.

Figure 2:
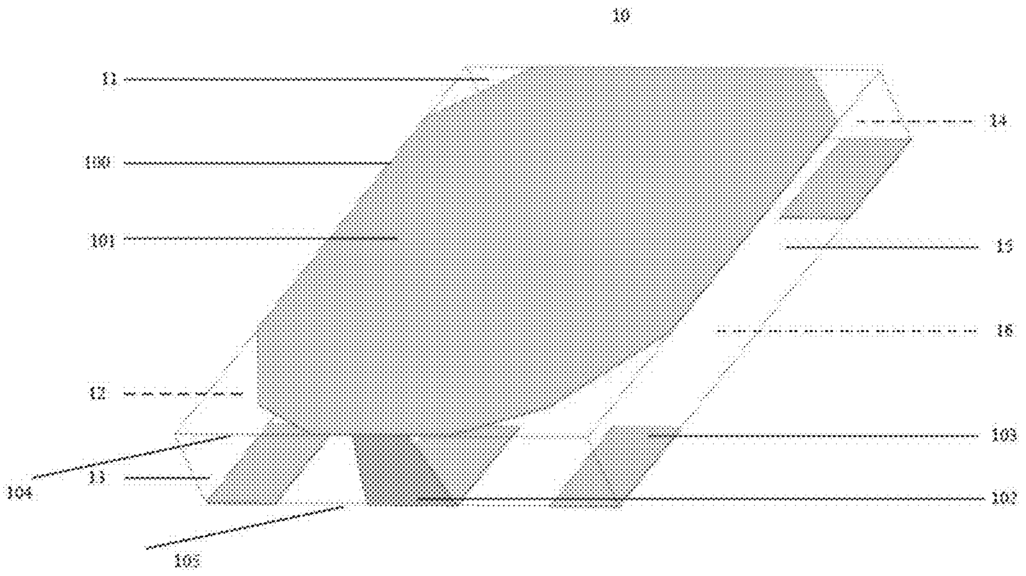
FIG. 2 is a structural view of a first antenna unit of a compact ceramic chip antenna array based on ultra-wide band three-dimensional direction finding according to an embodiment of the present invention.

FIG. 2 is a structural view of a first antenna unit of a compact ceramic chip antenna array based on ultra-wide band three-dimensional direction finding according to an embodiment of the present invention. Referring now to FIG. 2, in some embodiments, the first antenna unit 10, the second antenna unit 20, and the third antenna unit 30 respectively include a ceramic substrate carrier 100, a printed monopole antenna plate 101, a microstrip feeder conduction band 102 and a metal connection plate 103. The ceramic substrate carrier 100 includes a first surface 11, a second surface 12, a third surface 13, a fourth surface 14, a fifth surface 15, and a sixth surface 16. The printed monopole antenna plate 101 is arranged on the first surface 11 of the ceramic substrate carrier 100. The microstrip feeder conduction band 102 is arranged on the third surface 13 of the ceramic substrate carrier 100. The metal connection plate 103 is arranged on the sixth surface 16 of the ceramic substrate carrier 100. The microstrip feeder conduction band 102 is used for electrically connecting the printed monopole antenna plate 101 and the metal connection plate 103.

The first surface 11 and the third surface 13 meet at a first edge 104. The first surface 11 and the sixth surface 16 meet at a second edge 105.

In some embodiments, the printed monopole antenna plate 101 is a decahedral patch, the lower bottom edge of which is electrically connected to the microstrip feeder conduction band 102 at the first edge 104. An upper end of the printed monopole antenna plate 101 is a structure treated with a single corner cutting. A lower end of the printed monopole antenna plate 101 is a structure treated with a secondary corner cutting. The corner cutting process can improve the impedance matching in the frequency band of the ultra-wide band, so that the printed monopole antenna plate 101 is used to radiate in the ultra-wide band communication band. Thus, the electromagnetic energy is radiated more effectively and the radiation efficiency is improved.

A first end of the microstrip feeder conduction band 102 is electrically connected to a position of the printed monopole antenna plate 101 near to the second edge 105. A second end of the microstrip feeder conduction band 102 is electrically connected to the transmission structure of the metal coplanar waveguide transmission conduction band.

In some embodiments, the microstrip feeder conduction band 102 is a trapezoidal structure for realizing impedance transformation. The length of the microstrip feeder conduction band 102 is the same as the thickness of the ceramic substrate carrier 100. The length of the lower bottom side of the microstrip feeder conduction band 102 is the same as the width of the coplanar waveguide feeder. The width of the metal coplanar waveguide transmission conduction band is related to the thickness and dielectric constant of the dielectric substrate 01. The length of the upper bottom side of the microstrip feeder conduction band 102 is related to the shape and size of the printed monopole antenna plate 101.

In some embodiments, the metal connection plate 103 is used to connect the dielectric substrate 01 and the floor and impedance matching structure on the dielectric substrate 01. The metal connection plate 103 not only ensures the bonding strength between the ceramic chip antenna and the module test system, but also controls the size of the metal connection plate 103 so as not to cause reflection of the over-sized metal connection plate 103, which may cause excessive influence on the performance of the ceramic chip antenna. The metal connection plates at the four corner positions of the rear face of the ceramic chip antenna. The metal connection plates at the middle positions of the upper bottom edge and the lower bottom edge of the rear face of the ceramic chip antenna are all rectangular in shape. The rectangular width of the lower bottom edge is the same as the width of the printed coplanar waveguide feeder conduction band on the front face of the substrate.

In particular implementations, the ceramic substrate carrier 100 has a relatively high dielectric constant and is a ceramic material made by high temperature doping methods. The material properties may vary widely as desired. The metal connection plate 103 on the front side of the dielectric substrate carrier 00 and the metal connection plate 104 on the rear side of the ceramic chip antenna 10 are welded together. The shape and size of the metal connection plate 103 on the front side of the dielectric substrate 01 correspond to the shape and size of the metal connection plate 103 below the ceramic substrate carrier 100.

The metal connection plate 103 is used for connecting the connecting plate of the module test system. The shape of the metal connection plate 103 is rectangular. The metal connection plate 103 has six pieces in total, which are respectively distributed on the peripheral position of the sixth surface 16 of the ceramic substrate carrier 100.

The front side of the ceramic substrate carrier includes three groups of six metal connection plates for connecting chip antennas. The position of the connecting plate at the front side of each substrate corresponds to the connecting plate at the bottom of the chip antenna to ensure that the chip antenna is firmly integrated with the substrate.

The metal floorings are respectively arranged on the front side and the back side of the dielectric substrate 01. The metal floorings on the front side include a first metal floor 41 and a second metal floor 42 arranged on both sides of a first coplanar waveguide feeder 51, and a third metal floor 43 and a fourth metal floor 44 arranged on both sides of a third coplanar waveguide feeder 53. The second metal floor 42 and the third metal floor 43 are arranged on both sides of a second coplanar waveguide feeder 52.

In some embodiments, the printed coplanar waveguide feeder conduction band is arranged on the front side of the rectangular ceramic substrate carrier 100. The printed coplanar waveguide feeder conduction band includes three coplanar waveguide feeders, a first coplanar waveguide feeder 51, a second coplanar waveguide feeder 52 and a third coplanar waveguide feeder 53, which are respectively used for feeding the first antenna unit 10, the second antenna unit 20 and the third antenna unit 30. Taking the first coplanar waveguide feeder 51 as an example, the upper end of the first coplanar waveguide feeder 51 is horizontally connected to the metal connection plate 103 located at the middle of the upper and lower bottom edges of the sixth surface 16 of the ceramic substrate carrier 100. Meanwhile, the upper end of the first coplanar waveguide feeder 51 is also perpendicularly connected to the trapezoidal microstrip feeder conduction band on the third surface 13 of the first antenna unit 10. The printed coplanar waveguide feeder conduction band has a characteristic impedance of 50 ohms and its lower end is connected to the coaxial connector inner conductor.

In some embodiments, the dielectric substrate 01 has a dielectric constant of 2-10, a loss tangent of $10^{-3}$ or less, and a thickness of 3 mm or less.

Figure 3:
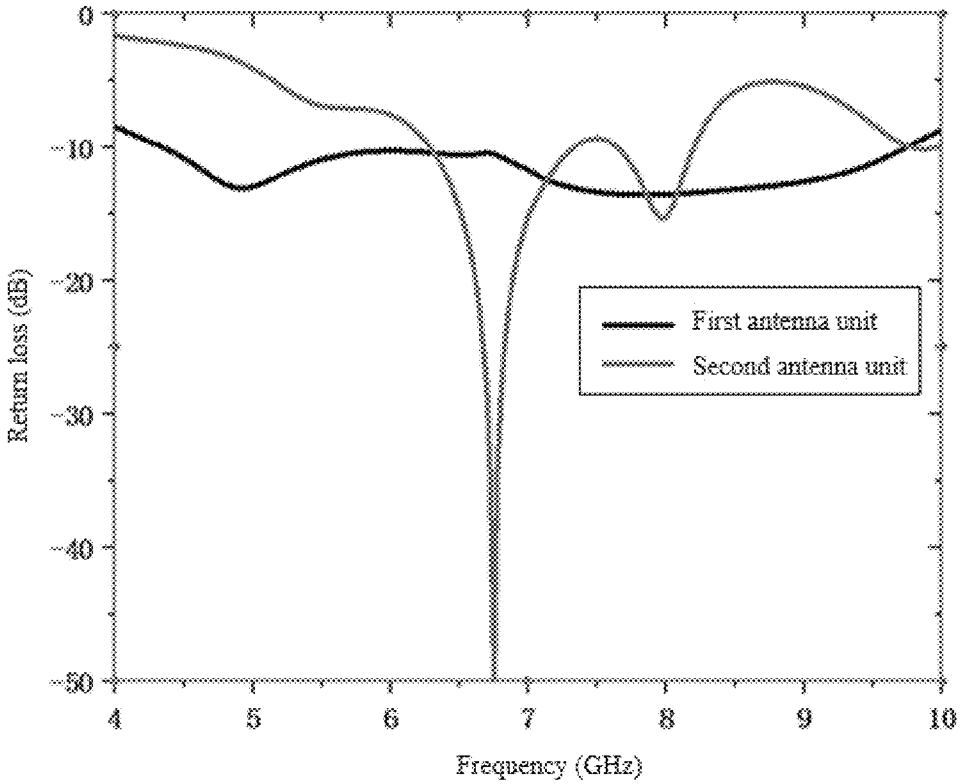
FIG. 3 is a graph of return loss for a first antenna unit and a second antenna of a compact ceramic chip antenna array based on ultra-wide band three-dimensional direction finding according to an embodiment of the present invention.

Referring now to FIGS. 3-9, FIG. 3 is a graph of return loss for a first antenna unit and a second antenna of a compact ceramic chip antenna array based on ultra-wide band three-dimensional direction finding according to an embodiment of the present invention. The ordinate of FIG. 3 is return loss/dB and the abscissa is frequency/GHz. Since the third antenna unit 30 and the first antenna unit 10 have a left-right symmetrical structure with the second antenna unit 20 and the intermediate second coplanar waveguide feeder 52 as axes, the scattering parameter characteristics of the third antenna unit 30 and the first antenna unit 10 in FIG. 3 are consistent.

Figure 4:
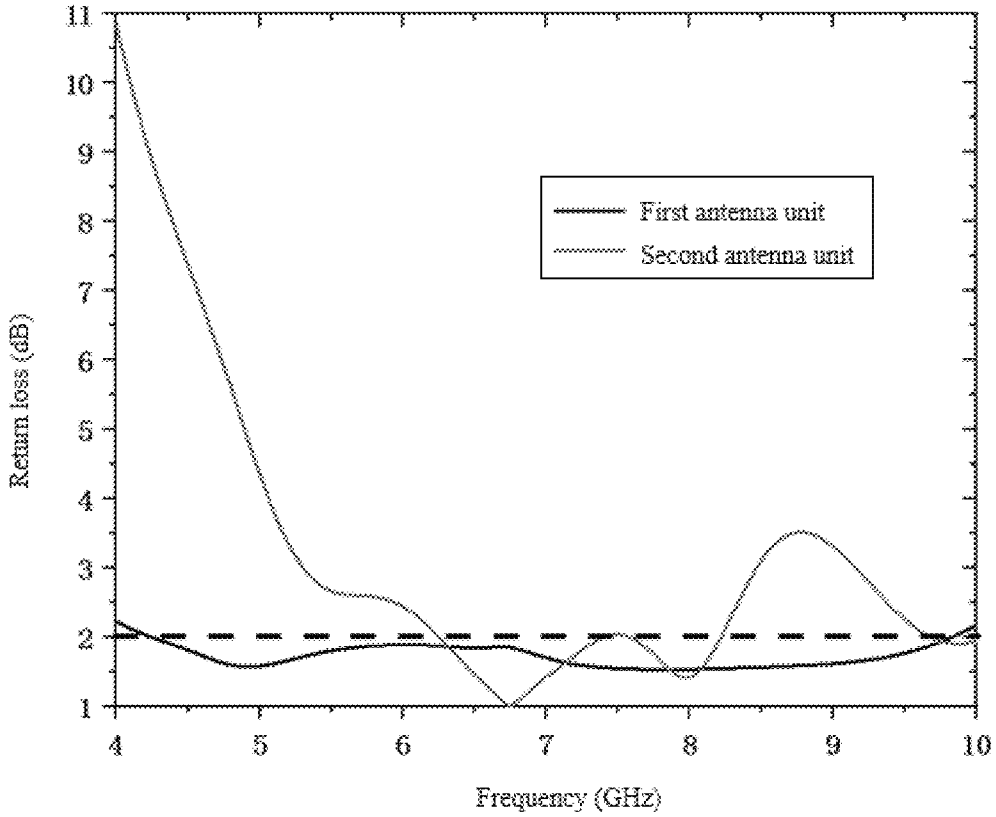
FIG. 4 is a graph of standing wave ratios for a first antenna unit and a second antenna unit of a compact ceramic chip antenna array based on ultra-wide band three-dimensional direction finding according to an embodiment of the present invention.

To better illustrate the characteristics of each antenna unit, corresponding to the return loss curve of FIG. 3, FIG. 4 is a graph of standing wave ratios for a first antenna unit and a second antenna unit of a compact ceramic chip antenna array based on ultra-wide band three-dimensional direction finding according to an embodiment of the present invention. As can be seen from FIGS. 3 and 4, the first antenna unit 10 and the third antenna unit 30 in the compact ceramic chip antenna array based on ultra-wide band three-dimensional direction finding in the present embodiment can operate at 4.13-9.82 GHz. The second antenna unit 20 in the compact ceramic chip antenna array based on ultra-wide band three-dimensional direction finding in the present embodiment may operate at 6.23-8.28 GHz. With the multiple impedance matching structures provided by the present invention, the standing wave ratios of the first antenna unit 10, the second antenna unit 20, and the third antenna unit 30 are all less than 2 at UWB positioning frequency bands (6.25-8.25 GHz) approved by FIRA.

Figure 5:
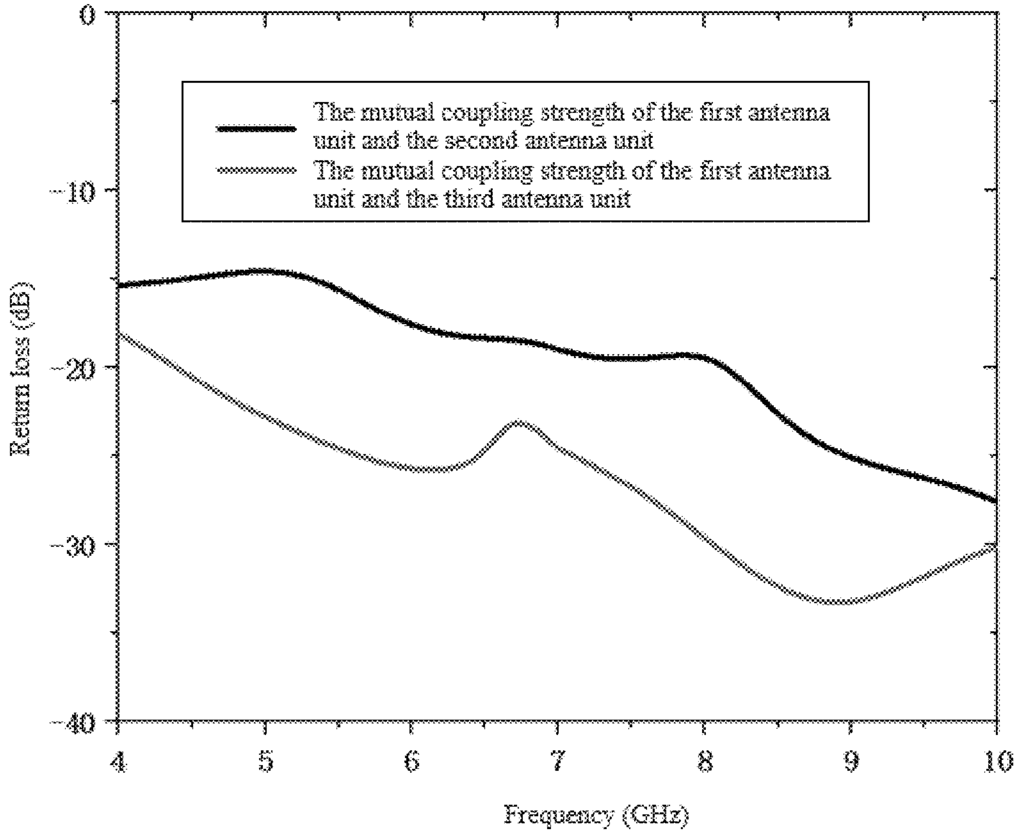
FIG. 5 is a graph of isolation among a first antenna unit, a second antenna unit, and a third antenna unit of a compact ceramic chip antenna array based on ultra-wide band three-dimensional direction finding according to an embodiment of the present invention.

FIG. 5 is a graph of isolation among a first antenna unit, a second antenna unit, and a third antenna unit of a compact ceramic chip antenna array based on ultra-wide band three-dimensional direction finding according to an embodiment of the present invention. The ordinate of FIG. 5 is the mutual coupling strength/dB, and the abscissa is the frequency/GHz, namely, the coupling strength of two adjacent antenna units and the furthest two antenna units. For a corresponding direction-finding antenna array, the reception characteristics of an ideal antenna unit are only related to its spatial position. The lower the mutual coupling between the array elements, the better the reception characteristics. Due to the compact ceramic chip antenna array, the spacing between antenna units is relatively increased, and the mutual coupling between array elements may be effectively reduced. As can be seen from FIG. 5, in the compact ceramic chip antenna array based on ultra-wide band three-dimensional direction finding in the present embodiment, the mutual coupling of the first antenna unit 10 and the second antenna unit 20 reaches −18 dB or less at frequency band of the ultra-wide band. The mutual coupling degree of the second antenna unit 20 and the third antenna unit 30 reaches −23 dB or less at the frequency band of the ultra-wide band. Since the volume of the first antenna unit 10, the second antenna unit 20 and the third antenna unit 30 itself is small, the mutual coupling between each array element is low, and the angular measurement accuracy of the antenna can be ensured. In addition, as the frequency increases, the mutual coupling between each array element further decreases.

Figure 6:
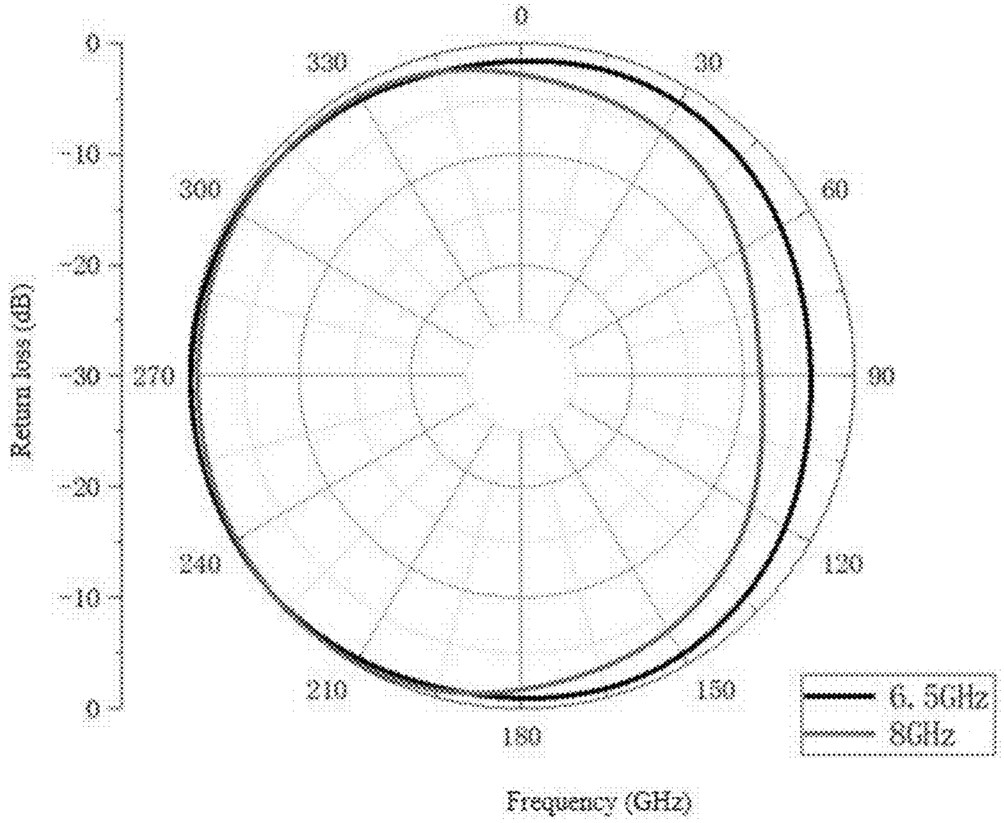
FIG. 6 is a schematic diagram of H-plane radiation directions of a first antenna unit of a compact ceramic chip antenna array based on ultra-wide band three-dimensional direction finding at different frequency points according to an embodiment of the present invention.
Figure 7:
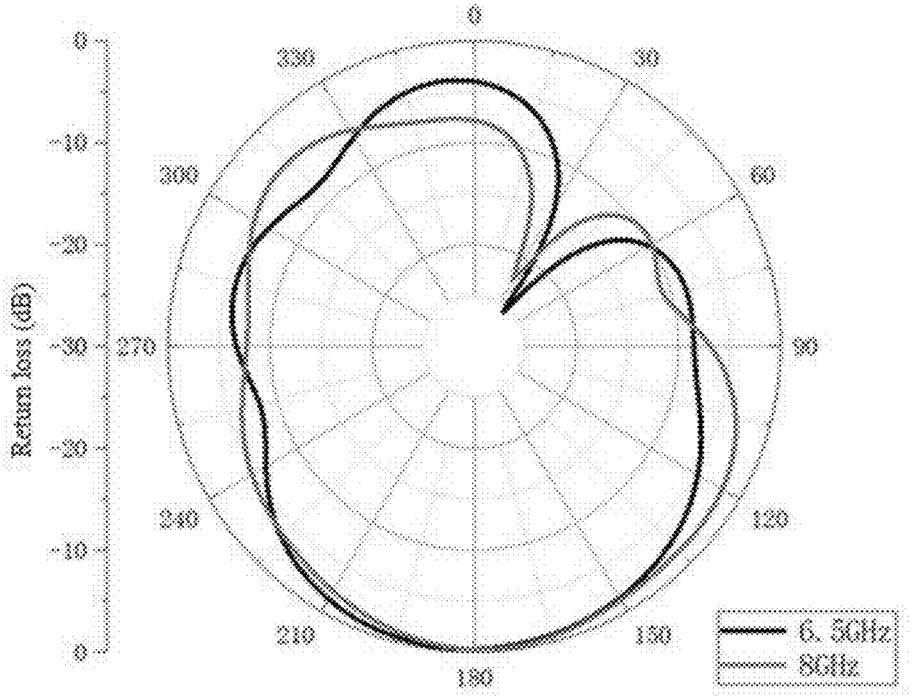
FIG. 7 is a schematic diagram of E-plane radiation directions of a first antenna unit of a compact ceramic chip antenna array based on ultra-wide band three-dimensional direction finding at different frequency points according to an embodiment of the present invention.

FIGS. 6 and 7 are schematic diagrams of H-plane and E-plane radiation direction diagrams of a first antenna unit of a compact ceramic chip antenna array based on ultra-wide band three-dimensional direction finding at different frequency points according to an embodiment of the present invention. Since the third antenna unit 30 and the first antenna unit 10 have a left-right symmetrical structure with the second antenna unit 20 and the intermediate second coplanar waveguide feeder 52 as axes, the radiation characteristics of the third antenna unit 30 and the first antenna unit 10 have the same symmetry. As can be seen from the radiation pattern of the first antenna unit 10 in the H-plane in FIG. 6, the first antenna unit 10 substantially exhibits an omni-directional characteristic at both 6.5 GHz and 8 GHz. Due to the presence of the metallic conduction band below the second antenna unit 20, the omni-directional characteristic of the first antenna unit 10 in the H-plane is partially affected at different frequencies. As can be seen from the radiation pattern of the first antenna unit 10 in the E-plane in FIG. 7, the radiation characteristics of the first antenna unit 10 in other directions are better, except in the direction in which the first antenna unit 10 is connected to the second antenna unit 20, which is affected by the upper and right metal conduction bands.

Figure 8:
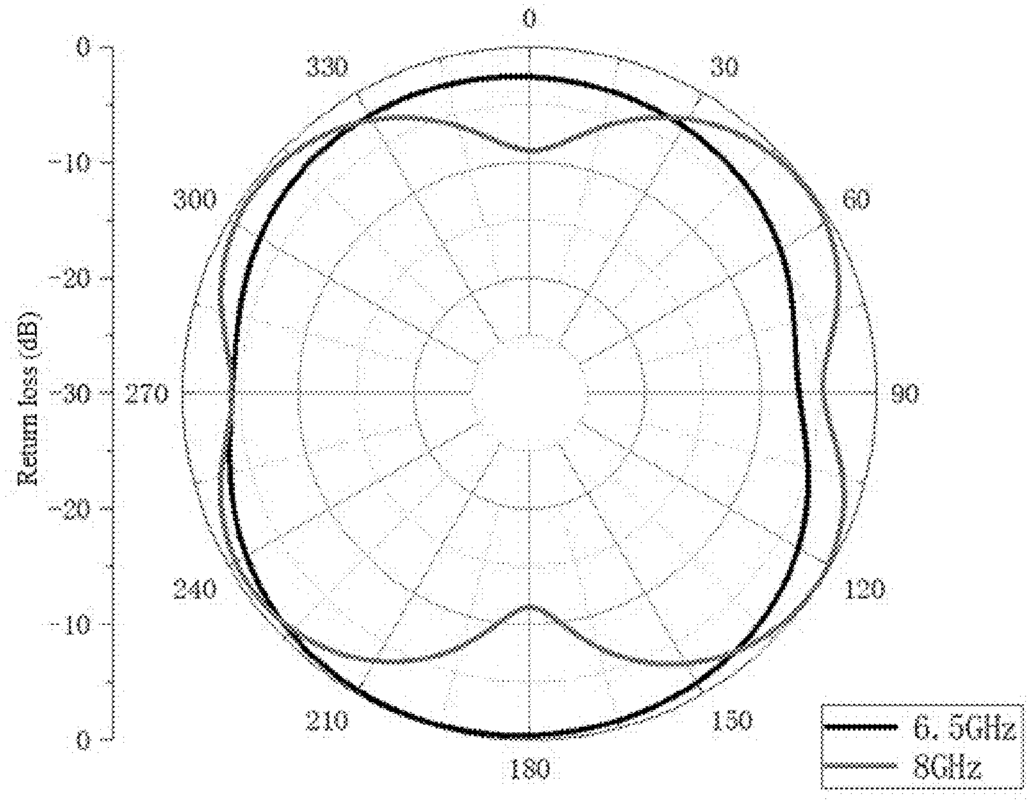
FIG. 8 is a schematic diagram of H-plane radiation directions of a second antenna unit of a compact ceramic chip antenna array based on ultra-wide band three-dimensional direction finding at different frequency points according to an embodiment of the present invention.
Figure 9:
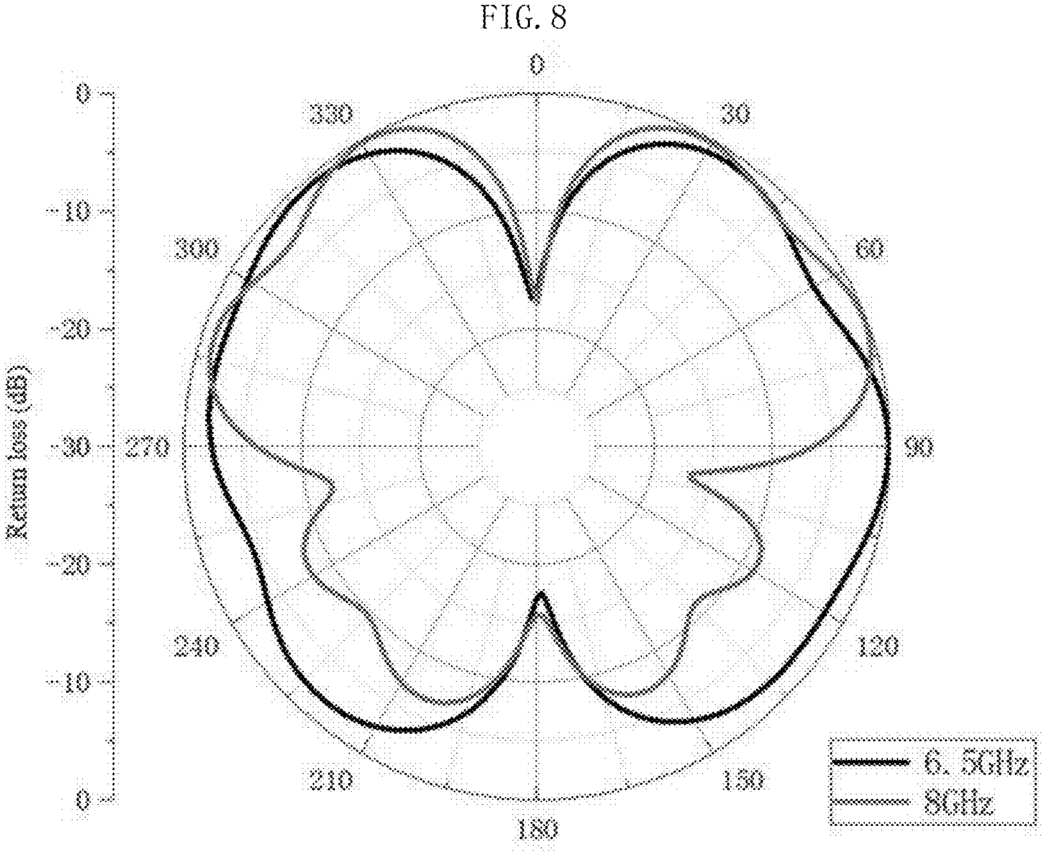
FIG. 9 is a schematic diagram of E-plane radiation directions of a second antenna unit of a compact ceramic chip antenna array based on ultra-wide band three-dimensional direction finding at different frequency points according to an embodiment of the present invention.

FIGS. 8 and 9 are schematic diagrams of H-plane and E-plane radiation direction of a second antenna unit of a compact ceramic chip antenna array based on ultra-wide band three-dimensional direction finding at different frequency points according to an embodiment of the present invention. As can be seen from the radiation patterns at frequency points of 6.5 GHz and 8 GHz in the frequency band of the ultra-wide band, the second antenna unit 20 in the ultra-wide band system shows similar characteristics to the half-wave oscillator omnidirectional antenna at both frequency points, respectively. The radiation pattern of the second antenna unit 20 maintains an omni-directionality in the H plane. The radiation pattern of the second antenna unit 20 shows a characteristic of smaller radiation in the up-down direction and larger radiation intensity in the both side directions in the E plane. As can be seen from the 6.5 GHz and 8 GHz radiation patterns in the H-plane and E-plane provided by an embodiment of the present invention, the first antenna unit 10, the second antenna unit 20 and the third antenna unit 30 of the compact ceramic chip antenna array in the ultra-wide band system all have relatively consistent radiation characteristics in the frequency band of the ultra-wide band.

In the implementation, the typical received power is not less than −90 dBm (angular sensitivity range) under the premise of using the pulse under the specification of IEEE 802.15.4z and using ADC (Analog-to-Digital Converter) with 1 GHz sampling rate in the receiver. The simulation and test results show that when the incident angle is in the range of −60-+60 degrees, the triple standard deviations of the angle measurement error may ensure that the angle error does not exceed plus or minus 5 degrees, which is suitable for the angle measurement application required by the current Internet of things.

In summary, A compact ceramic chip antenna array based on ultra-wide band three-dimensional direction finding of an embodiment of the present invention comprises a dielectric substrate, a ceramic chip antenna, an impedance matching structure on the front and back sides of the dielectric substrate, a metal floor and a coplanar waveguide feeder conduction band. The chip antenna array has a planar two-dimensional structure to achieve ultra-wide band three-dimensional direction finding. A first antenna unit, a second antenna unit and a third antenna unit are arranged in an equilateral triangle. Distances among the geometric centers of the first antenna unit, the second antenna unit and the third antenna unit are consistent. Three groups of angular measurement antenna arrays with an included angle of 60 degrees are formed from the first antenna unit to the second antenna unit, the first antenna unit to the third antenna unit and the third antenna unit to the second antenna unit, each group having an angular measurement range within plus or minus 60 degrees. The first antenna unit, the second antenna unit and the third antenna unit array combination can cover the entire 360 degree range of an azimuth angle, except for an azimuth plane, the first antenna unit, the second antenna unit and the third antenna unit being connected in pairs, and direction finding may also be performed within the plus or minus sixty degree range of a pitch angle, so as to form a three-dimensional direction finding application of the planar antenna array.

Furthermore, by adopting the impedance matching structure of the front and back sides of the dielectric substrate, the planar ceramic chip antenna array may achieve the operating frequency and bandwidth requirements of ultra-wide band ranging with more compact space and distribution, which meets the process design requirements of miniaturization of mobile terminals today.

Further, the ceramic chip antenna array comprises a first antenna unit, a second antenna unit and a third antenna unit. Under the condition of ensuring an effective isolation, each antenna unit is respectively configured to radiate in an ultra-wide band communication frequency band. According to an angle of arrival detection scheme of PDOA, the distance among the geometric centers of the first antenna unit, the second antenna unit and the third antenna unit is half a wavelength. Due to the compact volume of the ceramic chip antenna array, the size from the left edge of the first antenna unit to the right edge of the third antenna unit decreases, so that the space occupied by the whole ceramic chip antenna array effectively decreases.

Further, the first antenna unit, the second antenna unit and the third antenna unit in the ceramic chip antenna array take the geometric center thereof as a base point and have a smaller overall volume relative to other types of antenna units. The space among the first antenna unit, the second antenna unit and the third antenna unit increases. The coupling among the first antenna unit, the second antenna unit and the third antenna unit decreases and the isolation increases significantly so as to achieve an ideal high isolation. Each of the first antenna unit, the second antenna unit and the third antenna unit may be treated as a single antenna unit.

Further, the first impedance matching structure and the second impedance matching structure are respectively arranged on a right side of the first antenna unit and a left side of the third antenna unit; the first impedance matching structure and the second impedance matching structure are rectangular grooves etched on the metal floor; the fifth impedance matching structure and the sixth impedance matching structure are arranged on the second end of the second coplanar waveguide feeder; and the fifth impedance matching structure and the sixth impedance matching structure are rectangular metal patches, so that the second antenna unit operates on a frequency band of an ultra-wide band, which further improves the isolation among the first antenna unit, the second antenna unit and the third antenna unit again.

Furthermore, the first coplanar waveguide feeder conduction band, the second coplanar waveguide feeder conduction band and the third coplanar waveguide feeder conduction band are arranged on the front side of the dielectric substrate, which has advantages such as low cost, simple assembly and stable structure with respect to other feed structures.

Furthermore, the compact ceramic chip antenna array based on ultra-wide band three-dimensional direction finding according to the embodiments of the present invention has a width of only 2.3 cm and a height of only 3.4 cm, and has a very compact structure. After performance tests, it can be operated at fifth to ninth frequency bands of the ultra-wide band designated by FIRA for indoor positioning, namely 6.25 GHz-8.25 GHz, with the mutual coupling degree of the antenna being less than −18 db.

Finally, it should be noted that each embodiment above is only intended to illustrate the technical solution of the invention, but not to limit it. Although the invention has been described in detail with reference to each foregoing embodiment, those skilled in the art will appreciate that the technical solutions of the each above-mentioned embodiment can still be modified, or some of the technical features thereof can be equivalently substituted. Such modifications and substitutions will not cause the essence of the corresponding technical solutions to depart from the scope of the embodiments of the invention.

What is claimed is:

1. A compact ceramic chip antenna array based on ultra-wide band three-dimensional direction finding, comprising a dielectric substrate, a metal floor and a coplanar waveguide feeder, wherein a first antenna unit, a second antenna unit and a third antenna unit are arranged on a front side of the dielectric substrate; the first antenna unit and the third antenna unit are symmetrically arranged on both sides of the second antenna unit, respectively;

the coplanar waveguide feeder comprises a first coplanar waveguide feeder, a second coplanar waveguide feeder and a third coplanar waveguide feeder; the first coplanar waveguide feeder, the second coplanar waveguide feeder and the third coplanar waveguide feeder are electrically connected to the first antenna unit, the second antenna unit and the third antenna unit, respectively;

a first impedance matching structure, a second impedance matching structure, a third impedance matching structure and a fourth impedance matching structure are further arranged on the front side of the dielectric substrate;

a seventh impedance matching structure, an eighth impedance matching structure, a ninth impedance matching structure, a tenth impedance matching structure and a thirteenth impedance matching structure are arranged on a back side of the dielectric substrate;

the first impedance matching structure and the second impedance matching structure respectively correspond to the seventh impedance matching structure and the eighth impedance matching structure; the third impedance matching structure and the fourth impedance matching structure respectively correspond to the ninth impedance matching structure and the tenth impedance matching structure;

wherein the first impedance matching structure and the second impedance matching structure are respectively arranged on a right side of the first antenna unit and a left side of the third antenna unit; the first impedance matching structure and the second impedance matching structure are rectangular grooves etched on the metal floor; the third impedance matching structure and the fourth impedance matching structure are arranged on an extension section of a first end of the second coplanar waveguide feeder;

a fifth impedance matching structure and a sixth impedance matching structure are further arranged on the front side of the dielectric substrate;

an eleventh impedance matching structure and a twelfth impedance matching structure are further arranged on the back side of the dielectric substrate;

the fifth impedance matching structure and sixth impedance matching structure respectively correspond to the eleventh impedance matching structure and twelfth impedance matching structure;

the fifth impedance matching structure and sixth impedance matching structure are arranged at a second end of the second coplanar waveguide feeder; the fifth impedance matching structure and the sixth impedance matching structure are rectangular metal patches; and the first antenna unit, the second antenna unit and the third antenna unit are arranged in an equilateral triangle; a distance among each geometric center of the first antenna unit, the second antenna unit and the third antenna unit is half of a wavelength corresponding to a highest frequency point at a ninth frequency band of the ultra-wide band; and the ceramic chip antenna array structure has a width of 2.3 cm and a height of 3.4 cm.

2. The compact ceramic chip antenna array based on ultra-wide band three-dimensional direction finding according to claim 1, wherein the first and second impedance matching structures have a width of 3.1 mm and a height of 3.6 mm; the third and fourth impedance matching structures have a width of 2.6 mm and a height of 17.3 mm; and the thirteenth impedance matching structure has a width of 1.9 mm and a height of 3.6 mm.

3. The compact ceramic chip antenna array based on ultra-wide band three-dimensional direction finding according to claim 1, wherein the fifth impedance matching structure and the sixth impedance matching structure have a width of 2.8 mm and a height of 5.2 mm; and the thirteenth impedance matching structure has a width of 1.9 mm and a height of 3.6 mm.

4. The compact ceramic chip antenna array based on ultra-wide band three-dimensional direction finding according to claim 1, wherein the metal floor comprises a first metal floor, a second metal floor, a third metal floor, a fourth metal floor and a fifth metal floor; the first metal floor, the second metal floor, the third metal floor and the fourth metal floor are arranged on the front side of the dielectric substrate; the fifth metal floor is arranged on the back side of the dielectric substrate; a first gap is provided among the first metal floor, the second metal floor and the first antenna unit; and a second gap is provided among the third metal floor, the fourth metal floor and the third antenna unit.

5. The compact ceramic chip antenna array based on ultra-wide band three-dimensional direction finding according to claim 4, wherein the first metal floor, the second metal floor, the third metal floor, the fourth metal floor, and the fifth metal floor have metallized via holes therethrough.

6. The compact ceramic chip antenna array based on ultra-wide band three-dimensional direction finding according to claim 1, wherein the first antenna unit, the second antenna unit and the third antenna unit respectively comprise a ceramic substrate carrier, a printed monopole antenna plate, a microstrip feeder conduction band and a metal connection plate; the ceramic substrate carrier comprises a first surface, a second surface, a third surface, a fourth surface, a fifth surface and a sixth surface; the printed monopole antenna plate is arranged on the first surface of the ceramic substrate carrier; the microstrip feeder conduction band is arranged on the third surface of the ceramic substrate carrier; the metal connection plate is arranged on the sixth surface of the ceramic substrate carrier; the microstrip feeder conduction band is used for electrically connecting the printed monopole antenna plate and the metal connection plate; the printed monopole antenna plate is a decahedron patch; an upper end of the printed monopole antenna plate is a structure treated with a single corner cutting; and a lower end of the printed monopole antenna plate is a structure treated with a secondary corner cutting.

7. The compact ceramic chip antenna array based on ultra-wide band three-dimensional direction finding according to claim 6, wherein the microstrip feeder conduction band has a trapezoidal structure; the length of the microstrip feeder conduction band is the same as the thickness of the ceramic substrate carrier; the length of a lower bottom side of the microstrip feeder conduction band is the same as the width of the coplanar waveguide feeder; and the length of an upper bottom side of the microstrip feeder conduction band is related to the shape and size of the printed monopole antenna plate.

8. The compact ceramic chip antenna array based on ultra-wide band three-dimensional direction finding according to claim 1, wherein the dielectric substrate has a dielectric constant of 2-10, a loss tangent of $10^{-3}$ or less, and a thickness of 3 mm or less.

* * * * *